(12) United States Patent
Choi et al.

(10) Patent No.: US 10,204,292 B2
(45) Date of Patent: Feb. 12, 2019

(54) USER TERMINAL DEVICE AND METHOD OF RECOGNIZING OBJECT THEREOF

(71) Applicant: Samsung Electronics Co., Ltd., Suwon-si, Gyeonggi-do (KR)

(72) Inventors: Hyung-tak Choi, Suwon-si (KR); Ho-jung Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 439 days.

(21) Appl. No.: 14/953,162

(22) Filed: Nov. 27, 2015

(65) Prior Publication Data

US 2016/0171339 A1 Jun. 16, 2016

(30) Foreign Application Priority Data

Dec. 15, 2014 (KR) .................. 10-2014-0180176

(51) Int. Cl.
*G06K 9/00* (2006.01)
*G06K 9/62* (2006.01)

(52) U.S. Cl.
CPC ....... *G06K 9/6293* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 9,269,009 B1* | 2/2016 | Liu | G06K 9/18 |
| 2010/0177968 A1* | 7/2010 | Fry | A61B 5/0452 |
| | | | 382/224 |
| 2011/0161076 A1* | 6/2011 | Davis | G06F 3/04842 |
| | | | 704/231 |
| 2012/0087547 A1* | 4/2012 | He | G06K 9/629 |
| | | | 382/110 |
| 2015/0194025 A1* | 7/2015 | Tsunoda | G07G 1/0036 |
| | | | 348/150 |
| 2015/0254510 A1* | 9/2015 | McKinnon | G06F 17/30244 |
| | | | 382/103 |

* cited by examiner

*Primary Examiner* — Sean M Conner
(74) *Attorney, Agent, or Firm* — Jefferson IP Law, LLP

(57) ABSTRACT

A user terminal device is provided. The user terminal device includes a plurality of different types of sensors, a storage unit configured to store object information, and a controller configured to acquire sensing results of the plurality of sensors, determine a plurality of object categories respectively corresponding to the sensing results, and compare objects belonging to the plurality of object categories to estimate an object commonly belonging to the object categories as a recognition result.

16 Claims, 14 Drawing Sheets network topology

USER TERMINAL DEVICE AND METHOD OF RECOGNIZING OBJECT THEREOF

CROSS-REFERENCE TO RELATED APPLICATION(S)

This application claims the benefit under 35 U.S.C. § 119(a) of a Korean patent application filed on Dec. 15, 2014 in the Korean Intellectual Property Office and assigned Serial number 10-2014-0180176, the entire disclosure of which is hereby incorporated by reference.

TECHNICAL FIELD

The present disclosure relates to a user terminal device and a method of recognizing an object thereof. More particularly, the present disclosure relates to a user terminal device that accurately and quickly recognizes an object by using a plurality of sensors, and a method of recognizing an object thereof.

BACKGROUND

The development of mobile communication devices starting with smartphones and user terminal devices, and the high distribution rate of smartphones, have enabled users to easily acquire and exchange information even in everyday lives.

In order to extend functions and performances supported by user terminal devices and enable users to further easily and familiarly use various functions provided from the user terminal devices, efforts to develop active user interfaces (UIs) and interactive user experiences (UXs) of the user terminal devices have been made.

An existing user terminal device has used a voice recognition technology of a user as a unit for inputting a command for executing functions installed in the user terminal device. In this case, the voice recognition technology is used as a method of converting a natural language (a voice) of a person into a computer language recognizable by a machine to generate a command, and transmitting the command to a function module simply supported by the user terminal device.

However, since the natural language has an ambiguous meaning or a homonym, it is difficult to form a command intended by a user by using only information simply converted from a voice into a text.

In addition, since a user carries and uses a mobile user terminal device, a distorted command is transmitted or wrong information is acquired due to an effect of a surrounding environment such as noise or the like.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal device that further accurately and quickly recognizes an object by using a plurality of sensors, and a method of recognizing an object thereof.

In accordance with an aspect of the present disclosure, an object recognizing method of a user terminal device is provided. The method includes activating a plurality of different types of sensors, acquiring sensing results of the plurality of sensors, determining a plurality of object categories respectively corresponding to the sensing results, and estimating an object commonly belonging to the plurality of object categories as a recognition result.

The object recognizing method includes giving the plurality of object categories probabilistic numbers to which an object to be recognized belongs. An object, which has a high probability as the object to be recognized among a plurality of objects commonly belonging to the plurality of object categories, may be estimated as the recognition result based on the probabilistic numbers given to the plurality of object categories.

The determining of the plurality of object categories includes in response to position information of the user terminal device being sensed by a position sensor as one of the plurality of sensors, determining an object category including objects existing in a location corresponding to the position information.

The determining of the plurality of object categories includes in response to a smell being sensed by a smell sensor as one of the plurality of sensors, determining an object category including objects associated with the smell.

The determining of the plurality of object categories includes in response to a sound being sensed by a sound sensor as one of the plurality of sensors, determining an object category including objects associated with the sound.

The determining of the plurality of object categories includes in response to a user image being captured by a camera as one of the plurality of sensors, parsing a user expression in the user image, and determining one selected from a positive category including objects having positive attributes and a negative category including objects having negative attributes according to the user expression.

The determining of the plurality of object categories further include in response to a user voice being sensed by a sound sensor as one of the plurality of sensors, parsing a tone of the user voice, and determining one selected from a positive category including objects having positive attributes and a negative category including objects having negative attributes according to a characteristic of the tone.

The determining of the plurality of object categories may further include: in response to a bio-signal being sensed by a bio-signal sensor as one of the plurality of sensors, determining one selected from a positive category including objects having positive attributes and a negative category including objects having negative attributes according to a characteristic of the bio-signal.

The plurality of sensors may include at least one selected from a sound sensor, a smell sensor, a camera, a position sensor, a motion sensor, a pressure sensor, a fingerprint sensor, a hall sensor, an inertia sensor, an acceleration sensor, a heart rate sensor, an illumination sensor, a Wi-Fi sensor, and a compass sensor.

In accordance with another aspect of the present disclosure, a user terminal device is provided. The user terminal device includes a plurality of different types of sensors, a storage unit configured to store object information, and a controller configured to acquire sensing results of the plurality of sensors, determine a plurality of object categories respectively corresponding to the sensing results, and compare objects belonging to the plurality of object categories to estimate an object commonly belonging to the object categories as a recognition result.

The controller may give the plurality of object categories probabilistic numbers to which an object to be recognized belongs and estimates an object, which has a high probability as the object to be recognized among a plurality of objects commonly belonging to the plurality of object categories, as the recognition result based on the probabilistic numbers given to the plurality of object categories.

The plurality of sensors includes a position sensor. In response to position information of the user terminal device being sensed by the position sensor, the controller may determine an object category including objects existing in a location corresponding to the position information.

The plurality of sensors includes a smell sensor. In response to a smell being sensed by the smell sensor, the controller may determine an object category including objects associated with the smell.

The plurality of sensors includes a sound sensor. In response to a sound being sensed by the sound sensor, the controller may determine an object category including objects associated with the sound.

The plurality of sensors includes a camera. In response to a user image being captured by the camera, the controller may parse a user expression in the user image and determine one selected from a positive category including objects having positive attributes and a negative category including objects having negative attributes according to the user expression.

The plurality of sensors includes a sound sensor. In response to a user voice being sensed by the sound sensor, the controller may parse a tone of the user voice and determine one selected from a positive category including objects having positive attributes and a negative category including objects having negative attributes according to a characteristic of the tone.

The plurality of sensors includes a bio-signal sensor. In response to a bio-signal of a user being sensed by the bio-signal sensor, the controller may determine one selected from a positive category including objects having positive attributes and a negative category including objects having negative attributes according to a characteristic of the bio-signal.

The plurality of sensors includes at least one selected from a sound sensor, a smell sensor, a camera, a position sensor, a motion sensor, a pressure sensor, a fingerprint sensor, a hall sensor, an inertia sensor, an acceleration sensor, a heart rate sensor, an illumination sensor, a Wi-Fi sensor, and a compass sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
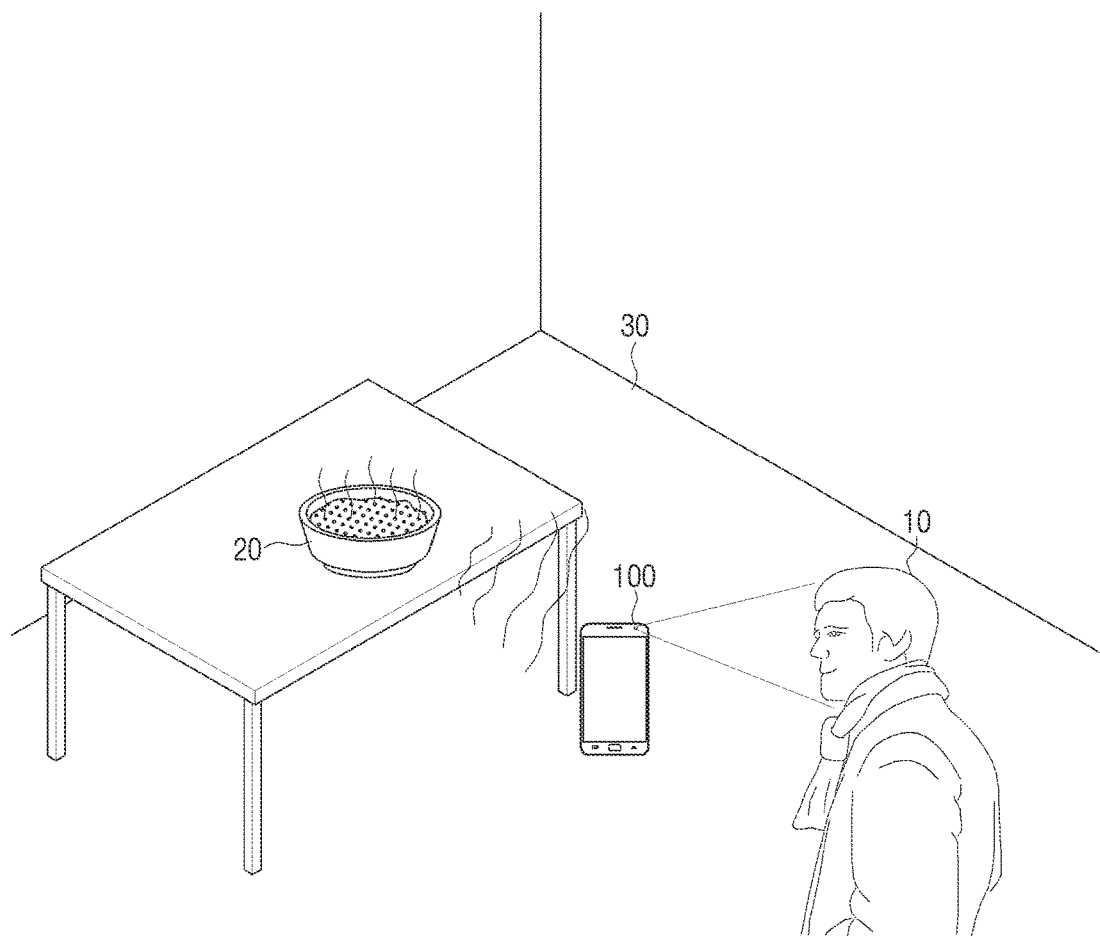
FIG. 1 is a view illustrating sensing of a user terminal device according to an embodiment of the present disclosure.

FIG. 1 is a view illustrating sensing of a user terminal device 100 according to an embodiment of the present disclosure.

Referring to FIG. 1, a user 10, the user terminal device 100, and an object 20 are located in a particular space 30.

The user 10 recognizes an object of interest. In detail, the user 10 may recognize a particular object of interest among surrounding objects by using a perception ability of a human and may want to acquire information about the particular object of interest.

The user 10 may also manipulate the user terminal device 100. In detail, the user 10 may manipulate the user terminal device 100 through an interface provided from the user terminal device 100. Also, the user 10 may want to manipulate the user terminal device 100 to acquire information about an object of interest.

The object 20 is a tangible thing or an intangible thing. In detail, the object 20 may be a formless thing that is seen with eyes and touched by a hand, an intangible thing, such as a color, a smell, a sound, or the like, that is recognized by a human, or a thing that is not recognized or is difficult to be recognized with an ability of the human but is conceptualized as a particular object.

The user terminal device 100 may sense at least one or more pieces of information. In detail, the user terminal device 100 may include a plurality of sensors that sense light, sounds, smells, positions, etc.

The user terminal device 100 may be a portable terminal device such as a mobile phone, a personal digital assistant (PDA), a potable multimedia player (PMP), a laptop personal computer (PC), a tablet PC, an ultra-mobile personal computer (UMPC), or the like. However, the user terminal device 100 is not limited thereto and thus may be any device that may include a plurality of sensors and process information.

More detailed structure and operation of the user terminal device 100 will be described later with reference to FIG. 2.

FIG. 1 illustrates a scenario through which the user 10 recognizes a smell of the object 20 as an object of interest in the particular space 30 and acquires information about the smell occurring from the object 20 by using the user terminal device 100.

Here, the object 20 that is recognized as the object of interest by the user 10 is food that gives out a smell corresponding to a particular food. Also, a geographical position of the particular space 30 where the user 10, the user terminal device 100, and the object 20 are located is a restaurant.

The user 10 recognizes the smell of the object 20. However, the user 10 does not know a type of the smell and thus wants to know what the smell is.

In this case, the user 10 may want to manipulate the user terminal device 10 to know information about the smell. In detail, the user 10 may manually input a command, which enables the user terminal device 10 to recognize the smell, through an interface installed in the user terminal device 100.

Alternatively, the user may activate a particular program of the user terminal device 100 to input a voice "What is the smell?" into the user terminal device 100. Here, the user terminal device 100 may check the input voice as a command for recognizing the smell and execute a process for recognizing the smell.

The user terminal device 100 may activate a sensor, which senses the smell, to recognize the smell. In detail, the user terminal device 100 may include a smell sensor, which senses a chemical component of a smell in the air, and activates the smell sensor to recognize the smell by using an electrical signal into which the chemical component of the smell is converted by the smell sensor.

However, since a particular smell in the air includes a small amount of one chemical component and a large amount of another chemical component, it is difficult for the user terminal device 100 to accurately provide an identity of the smell from a signal sensed by the smell sensor.

Therefore, the user terminal device 100 may activate a plurality of sensors to obtain additional information for recognizing the smell. In detail, the user terminal device 100 may activate a camera that captures a face of the user 10 and/or a position sensor that senses a geographical position of the user terminal device 100.

For example, the camera of the user terminal device 100 may be disposed in a front surface of the user terminal device 100 to capture the face of the user 10. Also, the camera of the user terminal device 100 may determine whether an expression made on the captured face of the user 10 is positive or negative.

In addition, a camera that is disposed in a back surface of the user terminal device 100 may capture the object 20 to determine a morphological feature of the object 20.

Alternatively, in the previous embodiment, the user terminal device 100 may analyze a tone of the user 10 from the voice "What is the smell?" input into the user terminal device 100 by the user in order to determine whether a tone feature of the user 10 is positive or negative.

Also, the user terminal device 100 may determine that the particular space 30 where the user terminal device 10 is the restaurant, from a position sensor that uses a global positioning system (GPS)/differential global positioning system (DGPS) using a satellite navigation signal or a real time kinematic (RTK) GPS using a mobile communication signal.

As described above, context or situation (or a circumstance) information may be used as additional information that is not direct information about a targeted object, such as information about whether a state of the user 10 is positive or negative and position information of the user 10, and that may be referred to for recognizing an object.

The user terminal device 100 may determine that the user 10 is in a positive state, from a smiling expression and a high tone of the user 10 and determine that a current position is a restaurant to estimate that the smell sensed by the smell sensor is a smell of food the user 10 likes and a smell of food sold in a restaurant of the current position.

For example, the user terminal device 100 may estimate the smell sensed by the smell sensor as a smell of food, determines that the food is a type of rice, bread, or noodles, determines that the food is noodles from a shape of a bowl where noodles are put, and estimates the food as chopped noodles corresponding to one of the types of noodles sold in the restaurant, and provide information indicating that the smell is a smell of the chopped noodles, as a result of recognizing an object.

As described above, a user terminal device according to the present disclosure may estimate an object having a highest relation between pieces of information sensed through a plurality of sensors, as a target. Therefore, the user terminal device may perform a very accurate and fast recognition.

Figure 2:
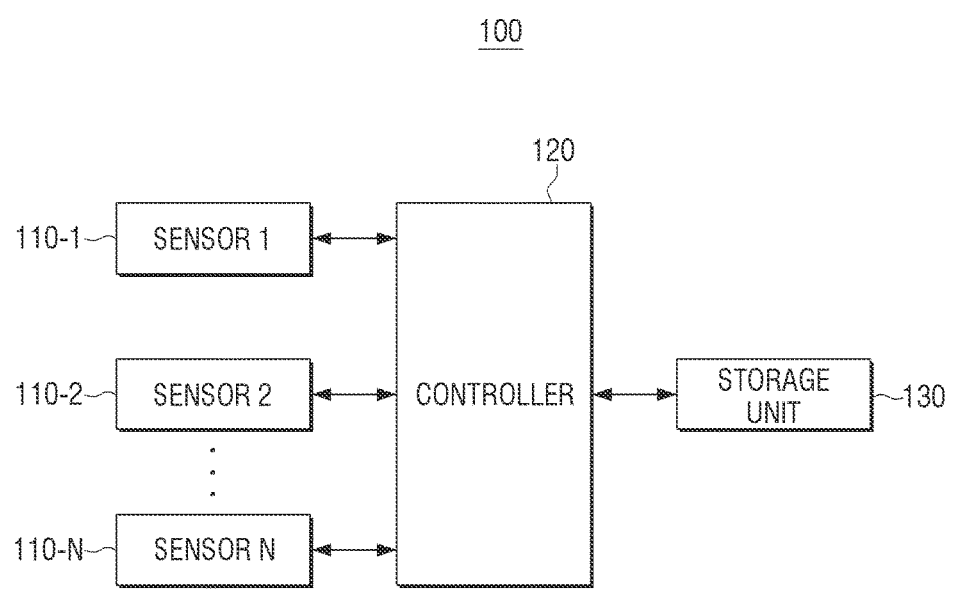
FIG. 2 is a block diagram illustrating a structure of a user terminal device according to an embodiment of the present disclosure.

FIG. 2 is a block diagram illustrating a structure of a user terminal device 100 according to an embodiment of the present disclosure.

Referring to FIG. 2, the user terminal device 100 includes a plurality of sensors 110-1, 110-2, . . . , and 110-N, a controller 120, and a storage unit 130.

The plurality of sensors 110-1, 110-2, . . . , and 110-N are different types. In detail, the plurality of sensors 110-1, 110-2, . . . , and 110-N may be different types of sensors that may sense different types of pieces of information for recognizing an object.

For example, the plurality of sensors 110-1, 110-2, ..., and 110-N may include at least one selected from a sound sensor, a smell sensor, a camera, a position sensor, a motion sensor, a pressure sensor, a fingerprint sensor, a hall sensor, an inertia sensor, an acceleration sensor, a heart rate sensor, an illumination sensor, a Wi-Fi sensor, and a compass sensor.

Here, the sound sensor may be a microphone that senses a sound wave and converts the sound wave into an electrical signal. The sound sensor may also be used to receive a voice of a user to determine whether the voice of the user is positive or negative or to sense information about a sound around the user terminal device 100.

The smell sensor may be used to sense a smell in the air so as to sense a concentration of the smell in the air and a surrounding dangerous chemical material and measure a quality of the air.

The camera may be used to convert an optical image, which is formed on a focus through an optical lens, into an electrical signal, check a motion of an object to be captured, and extract an optical focus distance with an image to be captured or a contour or feature points of a captured image. In particular, the camera may be used to capture a face of the user so as to read an expression of the user.

The position sensor may be used to sense a geographical position of the user terminal device 100. In detail, the position sensor may be used to sense a position of an earth image by using a navigation technology such as a GPS/RTK. Also, the position sensor may be used to check surrounding environment information of a current position where information about a building, a store, a district, and a road is combined with position information of the user terminal device 100.

The motion sensor may sense a distance between the user terminal device 100 and an object/the user or a motion having a particular pattern. For example, the motion sensor may determine whether a current user faces the user terminal device 100 or inputs a command through a particular hand gesture.

The pressure sensor may measure a pressure in the air. For example, the pressure sensor may be used to sense a low pressure or a high pressure so as to check additional information about a cloudy weather of a low pressure or a fine weather of a high pressure or may be used to check that a zone having a high altitude is an alpine zone having a low pressure.

The fingerprint sensor may be used to check an identity of a user who manipulates the user terminal device 100. If several users use the user terminal device 100, the fingerprint sensor may be used to use information about individual identities of the users.

The hall sensor may be used to sense changes in a magnetic field around the user terminal device 100. In detail, the hall sensor may be used to check an approach of a magnetic material to the user terminal device 100, position information of an electric station or a high electric line, etc.

A rotation sensor or the acceleration sensor may be used to check a position or a motion of the user terminal device 100. In detail, the rotation sensor or the acceleration sensor may check an inclining position, an overturning position, an erecting position, a lying position, etc. of the user terminal device 100. The rotation sensor or the acceleration sensor may be used to check a movement direction, a rotation direction, and a movement/rotation speed of the user terminal device 100.

The heart rate sensor may sense a heart rate of the user. In detail, the heart rate sensor may be used to measure the heart rate of the user so as to check whether the user is in an excited state or a relaxed state.

The illumination sensor may sense an amount of light around the user terminal device 100. In detail, the illumination sensor may be used to measure an amount of natural light or artificial light incident onto the user terminal device 100 so as to detect a brightness around the user terminal device 100.

The Wi-Fi sensor may sense a Wi-Fi signal for wireless Internet. In detail, the Wi-Fi sensor may sense a Wi-Fi signal that is generated from an access point positioned within a radius from the user terminal device 100 and may be used to detect an intensity of the Wi-Fi signal, a position of the access point, and information included in a packet complying with a wireless communication protocol.

The compass sensor may be used to sense a bearing. In detail, the compass sensor may be used to determine whether a longitudinally heading position of the user terminal device 100 is east, west, south, or north on the bearing.

Types of sensors that may be included in the plurality of sensors 110-1, 110-2, ..., and 110-N are not limited to the above-described example. Therefore, the plurality of sensors 110-1, 110-2, ..., and 110-N may further include sensors that may acquire associated information for measuring an object to be recognized.

The plurality of sensors 110-1, 110-2, ..., and 110-N are illustrated as independent blocks in FIG. 2 but may be realized as one sensor that may sense a plurality of pieces of information.

The storage unit 130 stores pieces of information used for operating the user terminal device 100. In detail, the storage unit 130 may store a program, a command, and data used for operating the user terminal device 100.

The storage unit 130 may store object information. In detail, the storage unit 130 may store object information about names, characteristic shapes, smells, colors, use purposes, relations, states, etc. of objects that exist in the world and are classified and conceptualized by humans.

For example, a category of object information indicating food for providing nutrients into a body of a human may include object information about a lower concept such as meal, drink, snacks, or the like. Also, object information about the meal may include object information about an even lower concept of the meal such as stew, rice, meat, or the like.

As described above, a computer ontology may be used as a technology of object information that may be stored in the storage unit 130 to infer an object. Here, the term computer ontology refers to metadata of a particular domain where information resources are expressed as sematic resources that may be parsed by a computer.

The storage unit 130 may be realized as an internal storage medium of the user terminal device 100 or an external storage medium, e.g., as a removable disc including a universal serial bus (USB) memory, a web server through a network, or the like. The storage unit 130 may also include a read only memory (ROM), a random access memory (RAM), or a memory card (e.g., a secure digital (SD) card, a memory stick, or the like) that may be installed in and/or removed from the user terminal device 100. Also, the storage unit 130 may include a nonvolatile memory, a volatile memory, a hard disc drive (HDD), or a solid state drive (SSD).

The controller 120 controls elements of the user terminal device 100. In detail, the controller 120 may control whether to activate the plurality of sensors 110-1, 110-2, ..., 110-N and control reading and writing of information. The controller 120 may also process information received from the plurality of sensors 110-1, 110-2, . . . , 110-N or information read from the storage unit 130.

In detail, the controller 120 may acquire sensing results of the plurality of sensors 110-1, 110-2, . . . , and 110-N and determine a plurality of object categories respectively corresponding to the sensing results. For example, if flowers sold in a flower shop are certain type of flower, the user terminal device 100 may acquire shape and color information of the flower through a camera sensor and determine variety categories of the flower corresponding to a plurality of pieces of the acquired information. The user terminal device 100 may also determine a flower shop in a current location and search for information about a shop name of the acquired flower shop or position information of the acquired flower shop to determine a type of flower sold in the corresponding flower shop as one category.

Also, the controller 120 may compare objects belonging to a plurality of object categories corresponding to the sensing results among object information stored in the storage unit 130 to estimate an object commonly belonging to the plurality of object categories as a recognition result.

In the above example, if an object belonging to a category sold in the acquired flower shop is cherry blossoms, narcissi, tulips, chrysanthemums, or roses, and an object of a category corresponding to a shape and a color of a flower acquired through the camera sensor has a red color of a rosaceae, the controller 120 may estimate the object as a variety of Kardinal that is red roses.

Here, the controller 120 may give the plurality of object categories corresponding to the sensing results a probabilistic number to which the object to be recognized will belong. In detail, the controller 120 may respectively give numbers to the plurality of object categories based on a reliable degree of a sensing result acquired from one of the plurality of sensors 110-1, 110-2, . . . , and 110-N, a degree indicating that a correlation between the sensing result and an object category is intimate, a degree of a possibility that an object will belong to a corresponding object category when a user or general public wants to recognize a current object in consideration of a user history of an object recognition function, a degree (or a semantic rank) of an extension of an object from a category accurately corresponding to the sensing result into a semantics-based associated object category, etc. For example, the controller 120 may give numbers to the object categories by using percentage values indicating probabilities.

Referring to the above example, a low number may be given to a category where an identity of a smell is determined as a flower based on a sensing result acquired through the smell sensor. However, a high number may be given to a category where the identity of the smell is determined as a flower based on a sensing result acquired through the camera sensor. From a different angle, the category where the identity of the smell is determined as the flower may be given a higher number than the category where the identity of the smell is determined as a perfume. Also, a lower concept of rosaceae may be given a lower number than a category of an upper concept that is a flower.

Also, the controller 120 may calculate a probability of an object that commonly belongs to the plurality of object categories that are determined. In detail, the controller 120 may calculate a probability that a corresponding object will be an object to be recognized, based on a number given to several object categories to which a common object belongs. The probability may be calculated in consideration of the number of object categories to which an object belongs in common and numbers given to the object categories.

For example, if the same flowers belong to an object category that is determined as an object category of rosaceae, a Kardinal variety of flowers belong to a rosaceae object category. Therefore, the flowers may be calculated as having a higher probability than other varieties of flowers.

The controller 120 may estimate a corresponding object as a recognition result according to calculated probabilities of a plurality of objects. In detail, the controller 120 may calculate rankings based on the probabilities of the objects and estimate an object having the highest ranking as a recognition result. Here, the user terminal device 10 may provide a user with a plurality of objects according to estimated rankings.

As in the above example, if position information of the user terminal device 100 is sensed by the position sensor, the controller 120 may determine an object category including objects existing in a space corresponding to the position information.

Also, if a smell is sensed by the smell sensor, the controller 120 may determine an object category including objects causing and/or associated with the smell. For example, when a particular scent is sensed by the smell sensor, the controller 120 may determine an object category including objects of varieties of any plants, fragrance products, and perfumes corresponding to a sensed flower scent.

Also, the controller 120 may extract features of an image captured by the camera to determine an object category including objects having extracted appearance features. If a user image is captured, the controller 120 may analyze a user expression in the user image and determine a positive category including objects having positive attributes and a negative category including objects having negative attributes according to the user expression. In detail, the controller 120 may determine the positive category if the user expression is determined as a smiling expression and determine the negative category if the user expression is determined as a grimacing expression.

If a sound is sensed by the sound sensor, the controller 120 may determine an object category including objects making sounds. For example, if a sound having a particular tone and a particular frequency are sensed, the controller 120 may determine a stringed instrument category including violins.

If a voice of the user is sensed by the sound sensor, the controller 120 may parse a tone of the voice of the user and determine one of a positive category including objects having positive attributes and a negative category including objects having negative attributes according to a characteristic of the tone. For example, if a bright tone voice is sensed, the controller 120 may determine the bright tone voice as a positive category. If a dark or irritated tone voice is sensed, the controller 120 may determine the dark or irritated tone voice as a negative category.

If a bio-signal of the user is sensed by a bio-signal sensor, the controller 120 may determine one selected from a positive category including objects having positive attributes and a negative category including objects having negative attributes according to a characteristic of the bio-signal. For example, if a pulse rate of the user is normal or a body of the user is relaxed, the controller 120 may determine the pulse rate or the body of the user as a positive category. If the pulse rate of the user quickens or the body of the user is tense, the controller 120 may determine the pulse rate or the body of the user as a negative category.

As described above, a user terminal device according to the present disclosure may estimate an object having a highest correlation between pieces of sensed information as a target so as to enable a more precise and fast recognition.

FIGS. 3 through 6 are views illustrating topologies through which the user terminal device 100 of FIG. 2 estimates objects as recognition results according to an embodiment of the present disclosure.

Figure 3:
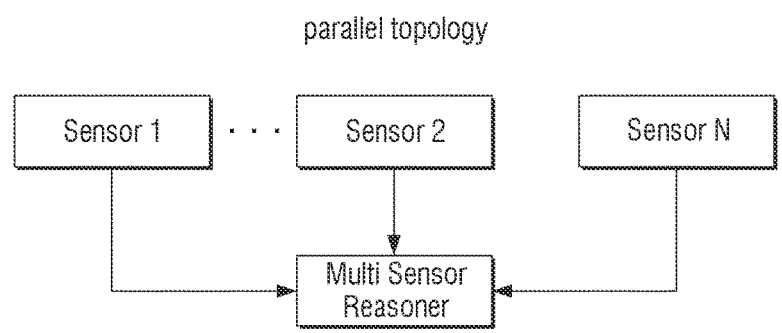
FIGS. 3, 4, 5, and 6 are views illustrating topologies through which the user terminal device of FIG. 2 estimates an object as a recognized result according to an embodiment of the present disclosure.

FIG. 3 is a view illustrating a parallel topology according to an embodiment of the present disclosure.

Referring to FIG. 3, the parallel topology includes a plurality of object categories Sensor 1, Sensor 2, . . . , and Sensor N that correspond to sensing results sensed from a plurality of sensors and a multi sensor reasoner that estimates an object commonly belonging to a plurality of object categories.

In detail, the multi sensor reasoner may perform an AND operation on a plurality of object categories respectively generated for the sensing results sensed from the plurality of sensors to determine and output at least one object commonly belonging to the object categories.

Figure 4:
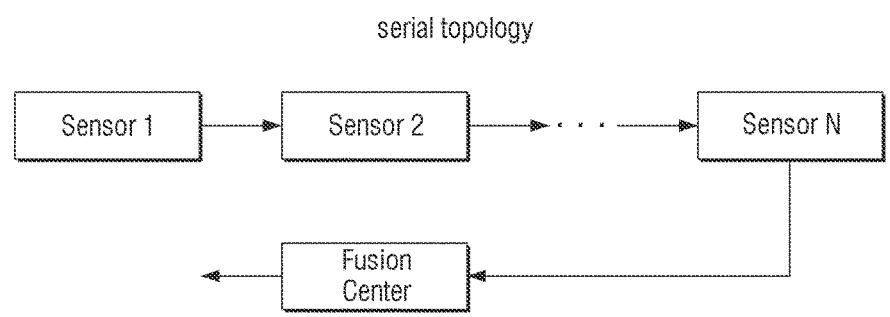

FIG. 4 is a view illustrating a serial topology according to an embodiment of the present disclosure.

Referring to FIG. 4, the serial topology determines an object corresponding to a sensing result sensed from a first one of a plurality of sensors as an object category Sensor 1 and determines an object category corresponding to a sensing result sensed from a second sensor within the object category Sensor 1. As described above, operations are sequentially performed to limit object categories respectively corresponding to the sensing results to an object category corresponding to a sensing result of a previous sensor.

If an object category Sensor N is determined by a laser sensor N, a fusion center outputs a result of at least one object belonging to the object category Sensor N according to a preset arrangement method.

Figure 5:
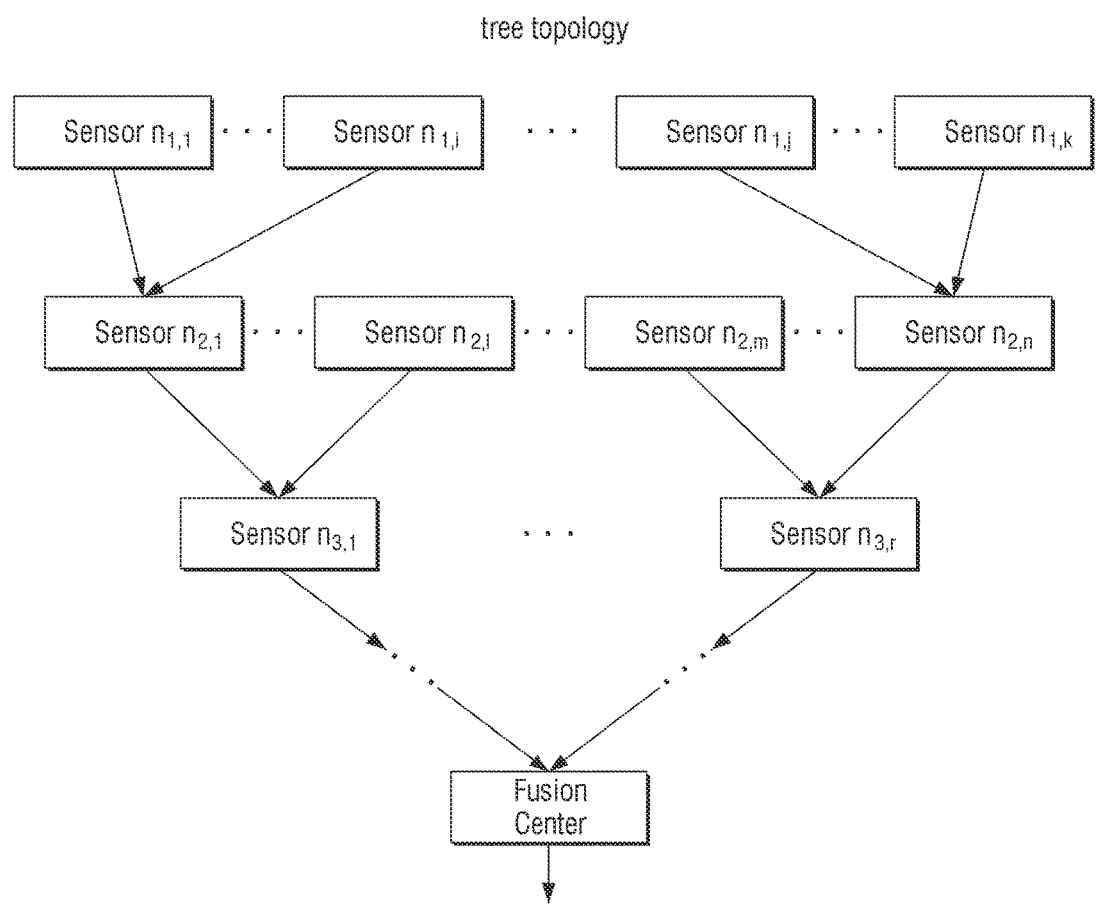

FIG. 5 is a view illustrating a tree topology according to an embodiment of the present disclosure.

Referring to FIG. 5, on a first layer, a plurality of object categories Sensor n1,1 . . . Sensor n1,$i$ . . . Sensor n1,$j$ . . . Sensor n1,$k$ corresponding to sensing results sensed from a plurality of sensors form a preset number of groups. Also, an AND operation is performed on the preset number of groups and object categories Sensor n2,1 . . . Sensor n2,1 . . . Sensor n2,$m$ . . . Sensor n2,$n$ of a second layer. Results of operations performed on the second layer form a preset number of groups, and then an AND operation is performed on the preset number of groups and object categories Sensor n3,1 . . . Sensor n3,$r$ of a third layer. As described above, several category groups are formed, and AND operations are simultaneously performed on the several category groups and then go to a next layer. Therefore, an operation speed increases, and a final fusion center outputs an object commonly belonging to a plurality of object categories.

Figure 6:
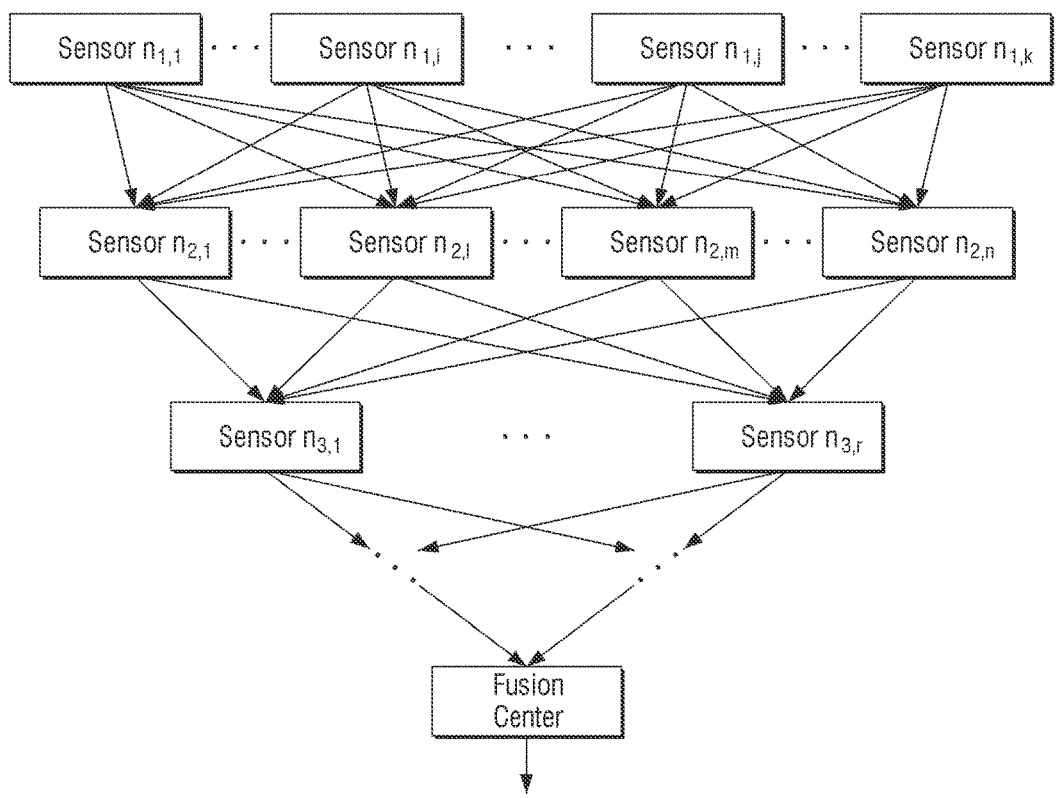

FIG. 6 is a view illustrating a network topology according to an embodiment of the present disclosure.

Referring to FIG. 6, an AND operation is performed on all object categories Sensor n1,1 . . . Sensor n1,$i$ . . . Sensor n1,$j$ . . . Sensor n1,$k$ of a first layer and a plurality of object categories Sensor n2,1 . . . Sensor n2,1 . . . Sensor n2,$m$ . . . Sensor n2,$n$ of a second layer. An AND operation is performed on results of operations performed on all of a plurality of object categories of the second layer and object categories Sensor n3,1 . . . Sensor n3,$r$ of a third layer. As described above, an operation is performed on all object categories existing on an upper layer and object categories of a lower layer to calculate object categories so as to enable results of an operation performed on one layer to be narrow ranges. Therefore, an operation speed is increased, and a final fusion center outputs an object commonly belonging to a plurality of object categories.

Figure 7:
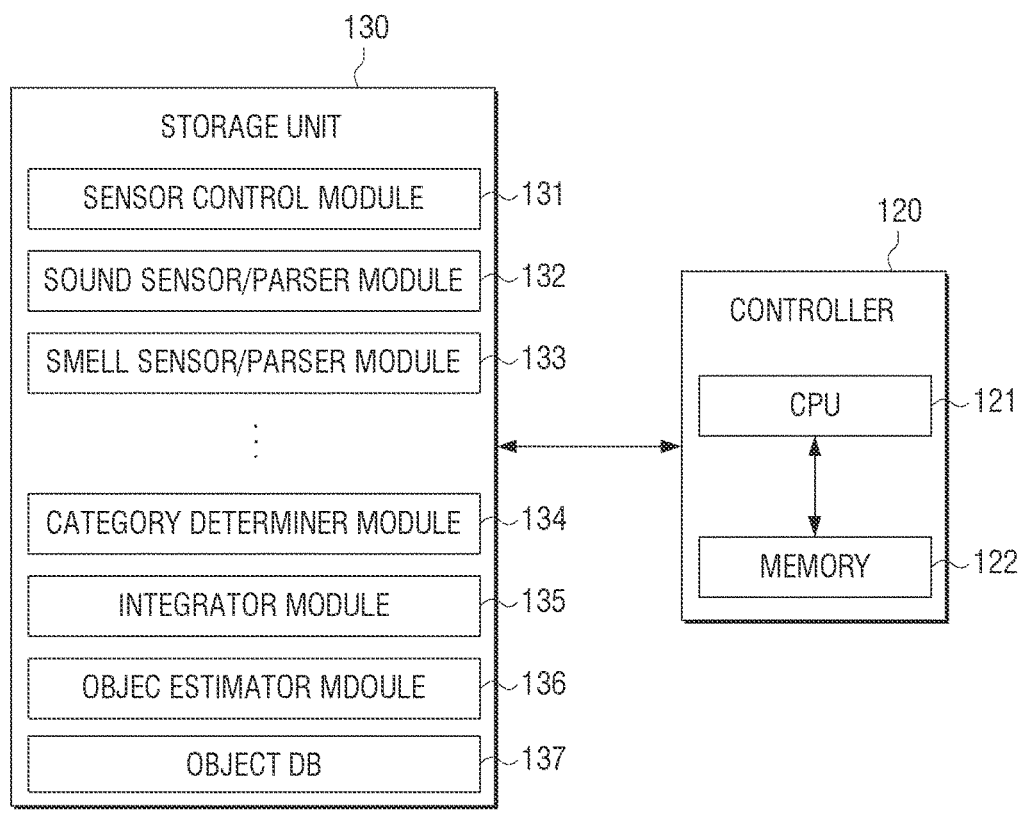
FIG. 7 is a block diagram illustrating a detailed structure of the user terminal device of FIG. 2 according to an embodiment of the present disclosure.

FIG. 7 is a block diagram illustrating a detailed structure of the user terminal device of FIG. 2 according to an embodiment of the present disclosure.

Referring to FIG. 7, the user terminal device of FIG. 2 includes the storage unit 130 and the controller 120.

The storage unit 130 includes a plurality of sensor/parser modules 132, 133 . . . including a sensor control module 131, a sound sensor/parser module 132, a smell sensor/parser module 133, etc., a category determiner module 134, an integrator module 135, an object estimator module 136, and an object database (DB) 137.

The sensor control module 131 may include control commands for activating or inactivating at least one selected from the plurality of sensors 110-1, 110-2, . . . , and 110-N of the user terminal device 100. The sensor control module 131 may further include data and control commands for controlling sensing sensitivities of the plurality of sensors 110-1, 110-2, . . . , and 110-N.

The plurality of sensor/parser modules 132, 133, . . . determine an attribute to which information input from at least one activated sensor belongs such as a sound or a smell and may include data and control commands for performing signal-processing appropriate for characteristics of pieces of sensed information.

For example, if a sound having a size of a preset decibel is input into a sound sensor, the sound sensor/parser module 132 may automatically execute a process of recognizing the sound and include program languages for parsing a waveform to determine whether the input sound includes meaningful information or is simply noise.

As another example, if a smell having a preset concentration or more is input into an activated smell sensor, the smell sensor/parser module 133 may automatically execute a process of recognizing the smell and include program languages for parsing whether the smell is a smell sensing signal corresponding to a pre-parsed smell material.

The category determiner module 134 may include data and a control command for determining an object category associated with information to be finally output from sensing results acquired by parsing pieces of sensing information sensed by the plurality of sensors 110-1, 110-2, . . . , and 110-N.

For example, even in case of a result of one piece of position information sensed by a position sensor, if final output information to be known is a name of food, menus sold in a restaurant of a corresponding position may be included in an object category. However, if the final output information to be known is a name of a person, a name of a worker working in the restaurant of the corresponding position may be included in an object category.

Also, the category determiner module 134 may determine a category where sensing results are recognized and conceptualized objects are classified by a human. In detail, the category determiner module 134 may include a program for searching a semantic network of a computer ontology for information corresponding to indicate instances sensed by the plurality of sensors 110-1, 110-2, . . . , and 110-N as particular concepts, attributes, or the like.

The integrator module 135 may include a program for performing an operation of integrating a plurality of object categories to extract a common object. Here, a method of the operation of integrating the plurality of object categories through the integrator module 135 may be a topology method as shown in FIGS. 3 through 6.

The object estimator module 136 may include data and a control command for estimating an object commonly belonging to the plurality of object categories as a recognition result.

In detail, the object estimator module 136 may include a program for giving a priority to a result that will be highly probable to be the object to be recognized among a plurality of objects calculated as a result of estimating an object to be recognized. Here, the high probability that the result will be the object to be recognized may be a statistical analysis or an analysis based on a use history, etc. of the user terminal device 100.

The object DB 137 may store a large amount of information about an object and an object category. In other words, a specification degree of the object DB 137 is associated with an accuracy of a result of estimating an object. Information of concepts and attributes stored in the object DB 137 may be classified and stored according to an ontology.

The controller 120 includes a central processing unit (CPU) 121 and a memory 122.

The controller 120 may be configured to control the storage unit 130 to copy the modules 131 through 137 included in the storage unit 130 into the memory 122 and control the CPU 121 to perform an operation according to instructions of program codes copied into the memory 122.

The controller 120 may be configured to temporarily store object DB information received from an external source in the memory 122 and record the object DB information in the object DB 137 of the storage unit 130 according to a copy command of the CPU 121.

The CPU 121 may include at least one selected from a single core processor, a dual core processor, a triple core processor, and a quad core process. The memory 122 may include an ROM and an RAM. Here, the CPU 121, the ROM, and the RAM may be connected to one another through an internal bus.

In the user terminal device 100 of FIG. 7, the one controller 120 has been described as a structure that calls software modules of the storage unit 130 and operates functions of the software modules. However, the controller 120 may be configured to form the software modules into an independent chip set and control the independent chip set to operate a function thereof.

As described above, a user terminal device according to the present disclosure may estimate an object having a highest correlation between pieces of information sensed through a plurality of sensors as a target so as to enable a more precise and fast recognition.

Figure 8:
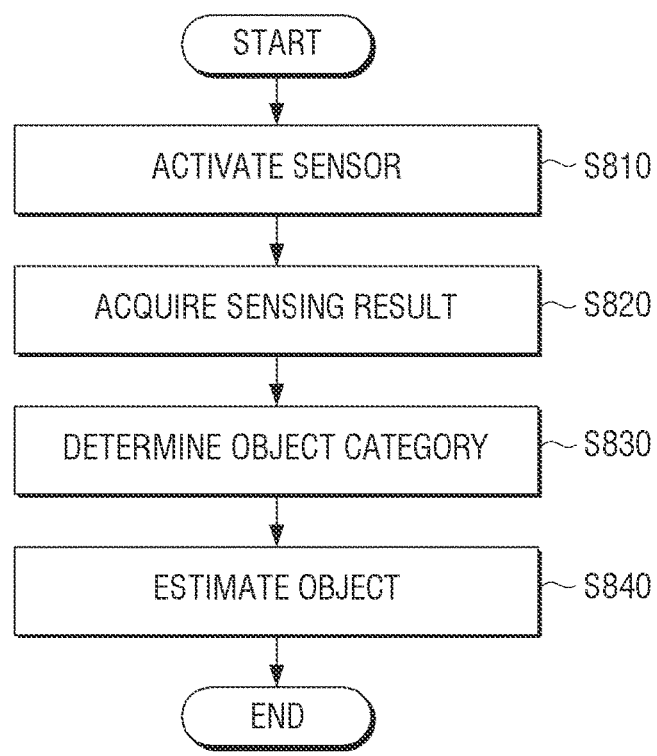
FIG. 8 is a flowchart illustrating a method of recognizing an object of a user terminal device according to an embodiment of the present disclosure.

FIG. 8 is a flowchart illustrating an object recognizing method of a user terminal device according to an embodiment of the present disclosure.

Referring to FIG. 8, in operation S810, at least one of a plurality of different types of sensors is activated. Here, the activated sensor may be selected from preset sensors according to an object to be recognized. For example, if a smell is to be recognized, a smell sensor, a front camera capable of capturing a face of a user, and a position sensor capable of sensing a geographical position of the user terminal device may be activated.

In operation S820, sensing results of the plurality of sensors are acquired. In detail, a signal sensed by the activated sensor is parsed to acquire a sensing result of a name or an attribute of the object to be recognized.

In operation S830, a plurality of object categories corresponding to the sensing result are determined. In detail, the sensing result that is conceptualized as cognitive information may search an ontology model for the sensing result to determine an object category including a lower object of the searched sensing result.

In operation S840, an object commonly belonging to the plurality of determined objects is estimated as a recognition result. For example, in a smell category including a plurality of objects, an expression of a user or a tone of a voice of the user may be parsed to determine whether a smell is a negative attribute or a negative attribute and estimate what the smell is.

Here, an object having a highest probability as an object to be recognized may be estimated as a recognition result based on a probabilistic number given to object categories to which the corresponding object commonly belongs.

As described above, according to the object recognizing method, an object having a highest correlation between pieces of information sensed through a plurality of sensors may be estimated as an object so as to enable a more precise and fast recognition.

Also, the object recognizing method may be realized in a user terminal device as shown in FIGS. 2 and 7. The object recognizing method may be realized as a program code that is stored on various types of recording media and executed by a CPU or the like. The program code in which the object recognizing method is realized may be distributed in an application form through a public network such as the Internet in a user terminal device that is realized as a smartphone.

In detail, a code for performing the above-described methods may be stored on and read from various types of recording media that may be read by a terminal, such as an RAM, a flash memory, an ROM, an erasable programmable ROM (EPROM), an electronically erasable and programmable ROM (EEPROM), a register, a hard disc, a removable disc, a memory card, a USB memory, a compact disc ROM (CD-ROM), etc.

Figure 9:
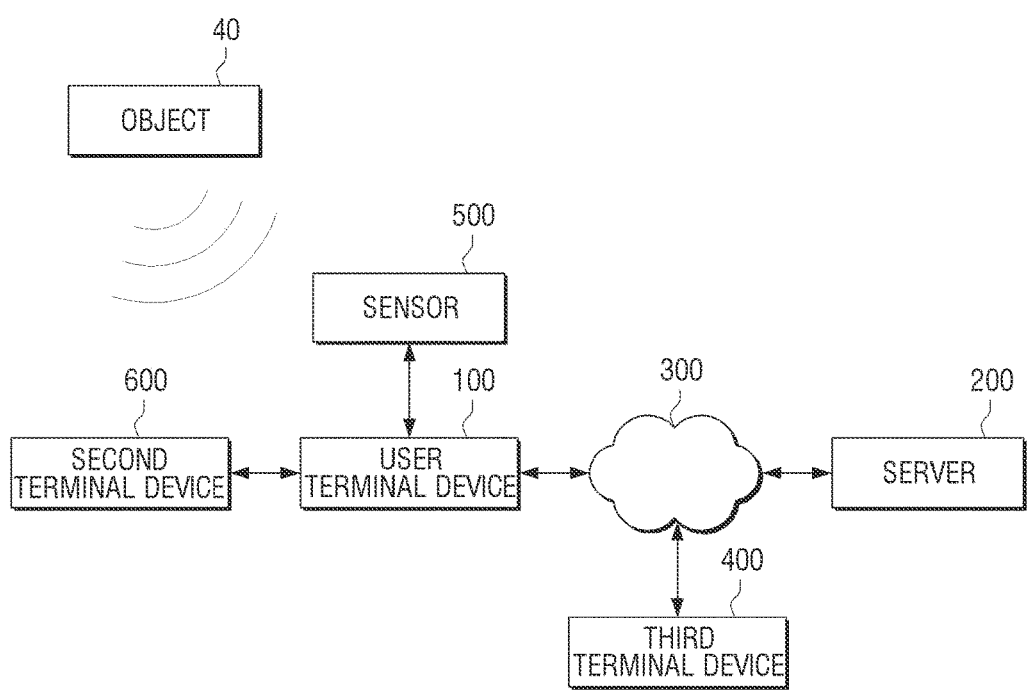
FIG. 9 is a block diagram illustrating an object recognizing system according to an embodiment of the present disclosure.

FIG. 9 is a block diagram illustrating a system for recognizing an object according to an embodiment of the present disclosure.

Referring to FIG. 9, the system including an object 40 to be sensed, a user terminal device 100, a server 200, a network 300, an external sensor 500, a second terminal device 600, and a third terminal device 400.

The user terminal device 100 may sense an attribute, a position, etc. of the object 40 by using a plurality of different types of sensors. A structure and an operation of the user terminal device 100 are the same as those of the user terminal device 100 of FIGS. 2 and 7, and thus their detailed descriptions are omitted.

The user terminal device 100 may include a communication interface to communicate with an external device. In detail, the user terminal device 100 may perform a device-to-device (D2D) communication by using the communication interface.

For example, the user terminal device 100 may directly perform a wireless communication with an external device positioned in a short distance, by using at least one selected from Bluetooth, a near field communication (NFC), and long term evolution (LTE) D2D. The user terminal device 100 may directly perform a wireless communication with an external device connected thereto through a communication cable by wire. In the embodiment illustrated in FIG. 9, external devices with which the user terminal device 100 performs D2D communications are the second terminal device 600 and the external sensor 500. The user terminal device 100 may perform a direct short range communication with a wearable device that may be put on a body of a human.

The user terminal device 100 may include information about the object 40 around the object 40 and perform communications with the external sensor 500 and the second terminal device 600 in a short distance from the user terminal device 100 to acquire a clue for estimating the object 40.

The user terminal device 100 may also be connected to the network 300 and communicate with the server 200 and the third terminal device 400 that are connected to the network 300.

In particular, the user terminal device 100 may directly communicate with an individual object. In detail, since the object 40 includes a radio frequency identification (RFID) including information indicating an identity of the object 40, the user terminal device 100 may acquire information about the object 40 through an RFID communication. In an Internet of Things (IoT) system where an Internet protocol (IP) address is allocated to an individual object, the user terminal device 100 may access an IP address allocated to the object 40 through the network to acquire information about the object 40.

The user terminal device 100 may directly include an algorithm and a DB for recognizing the object 40. However, at least one selected from an algorithm and a DB for recognizing an object may be installed in a server that supports an object recognition service to provide a result of the object 40 estimated through a communication with the user terminal device 100.

In this case, the user terminal device 100 may provide the server with information about the object 40 and receive an estimated result through a D2D communication with the server through the network 300 so as to overcome restrictions on a performance and resources of the user terminal device 100.

Figure 10:
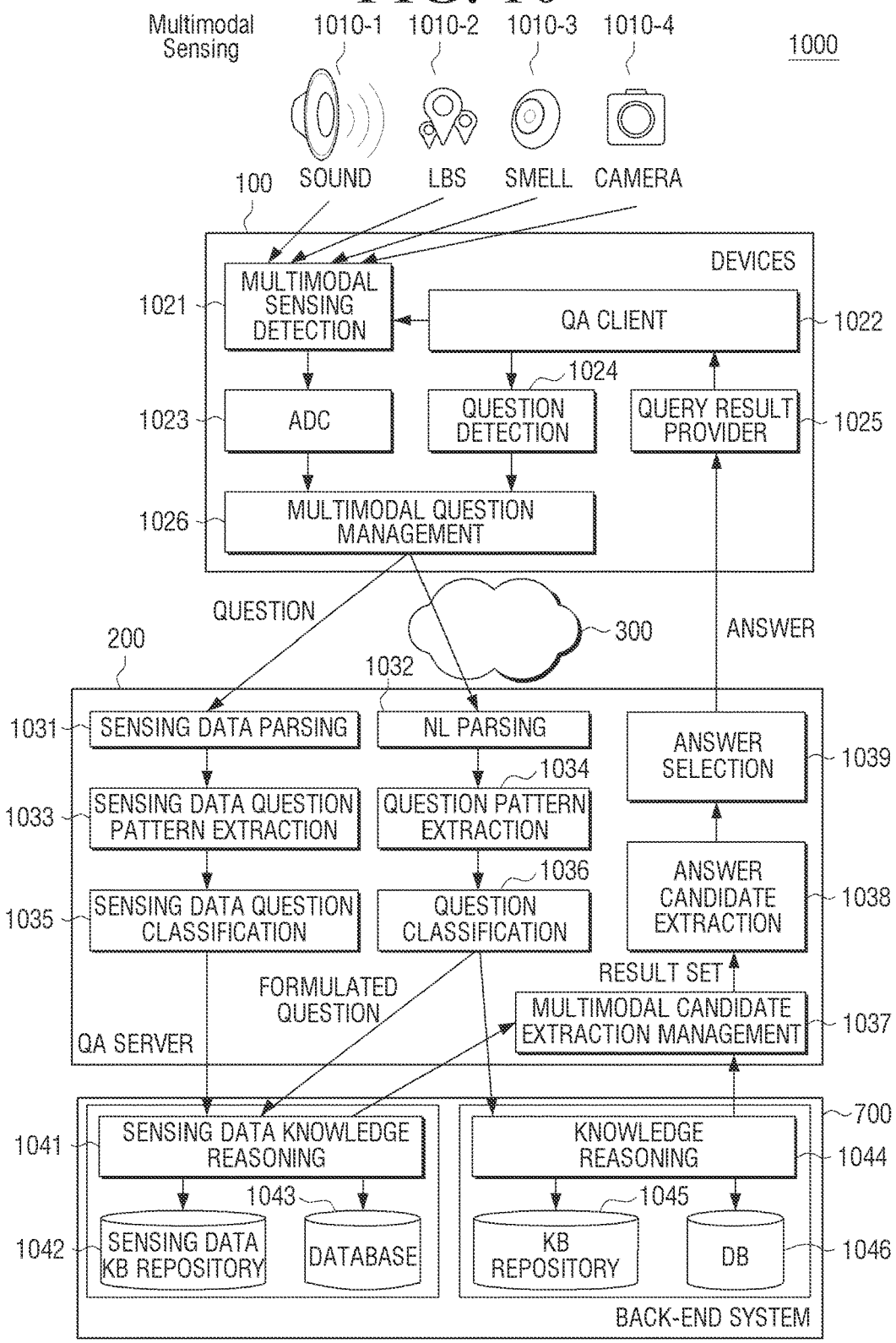
FIG. 10 is a block diagram illustrating a detailed structure of the object recognizing system of FIG. 9 according to an embodiment of the present disclosure.

FIG. 10 is a block diagram illustrating a detailed structure of a system 1000 for recognizing an object as shown in FIG. 9 according to an embodiment of the present disclosure.

Referring to FIG. 10, the system 1000 includes a user terminal device 100, a server 200, a network 300, and a back-end system 700.

The user terminal device 100 includes a plurality of sensors 1010-1, 1010-2, 1010-3, and 1010-4, a multimodal sensing detector 1021, a question and answer (QA) client 1022, an analog-to-digital converter (ADC) 1023, a question detector 1024, a query result provider 1025, and a multimodal question manager 1026.

The plurality of sensors 1010-1, 1010-2, 1010-3, and 1010-4 may include a sensor 1010-1 that senses a sound, a sensor 1010-2 that receives location-based service (LBS) information, a sensor 1010-3 that senses a smell, and a sensor 1010-4 that captures an image.

The multimodal sensing detector 1021 may perform a control for activating the plurality of sensors 1010-1, 1010-2, 1010-3, and 1010-4 and an operation of determining whether the sensors perform sensing.

The QA client 1022 may provide a user who uses the user terminal device 100, with an interface through which the user inquires about an object the user wants to know about and an interface that provides a result estimated as the object as an answer.

The ADC 1023 digitizes pieces of analog information received from the plurality of sensors 1010-1, 1010-2, 1010-3, and 1010-4. If pieces of digitized information are received from the plurality of sensors 1010-1, 1010-2, 1010-3, and 1010-4, the ADC 1020 may not be included.

The question detector 1024 analyzes whether an input of the QA client 1022 is a question. In detail, the question detector 1024 may determine whether the user asks a quest from a particular keyword. For example, the question detector 1024 determines that a text "What is the smell?" is input as a question with a keyword such as "what" or "?" and distinguish a high tone of an end of an input voice or a voice "What" from the input voice to determine that a question is input.

The query result provider 1025 may receive a result selected by the server 200 and control the QA client 1022 to provide the user with an answer to the question of the user.

The multimodal question manager 1026 may receive digitized sensing information and question information of the user and transmit the digitized sensing information and the question information of the user to the server 200, which may provide an answer to a question, through the network 300.

The server 200 may include a sensing data parser 1031, a natural language (NL) parser 1032, a sensing data question pattern extractor 1033, a question pattern extractor 1034, a sensing data question classifier 1035, a question classifier 1036, a multimodal candidate extraction manager 1037, an answer candidate extractor 1038, and an answer selector 1039.

The sensing data parser 1031 parses pieces of information sensed by the plurality of sensors 1010-1, 1010-2, 1010-3, and 1010-4. For example, the sensing data parser 1031 may parse a frequency from sensing information, into which a sound sensed by the sound sensor 1010-1 is converted into a digital signal, to parse the frequency into a frequency domain having a baseband or a particular band including meaningful information and a frequency band including noise such as surrounding noise.

The NL parser 1032 may parse an NL used by a person into words, meanings of which are divided. For example, the NL parser 1032 may parse a question sentence "What is this smell?" as a voice or text input into "this", "What", "smell", and "is?".

The sensing data question pattern extractor 1033 extracts a pattern having a pattern in a relation between information sensed by the plurality of sensors 1010-1, 1010-2, 1010-3, and 1010-4 and a question from the information.

For example, the sensing data question pattern extractor 1033 may parse information about a smell sensed by the smell sensor 1010-3 and extract a pattern of the smell having a pattern associated with a question from parsed data. In detail, the sensing data question pattern extractor 1033 may extract data having a pattern corresponding to a chemical component, which is mixed with a chemical component in the air to generate a bad smell, from data about a sensed smell.

The question pattern extractor 1034 may extract a part having a pattern of a question from a parsed NL. Next to the above-described example, the question pattern extractor 1034 may extract only a "smell" from a question sentence to know what the smell is.

The sensing data question classifier 1035 may classify pieces of extracted sensing data to form categories. In detail, the sensing data question classifier 1035 may classify the pieces of the extracted sensing data into extracted sound data, position data, smell data, and image data.

The question classifier 1036 may classify which question category to be provided that a final answer belongs to. For example, since an answer to a type of smell is provided with respect to a question of the smell, the question classifier 1036 classifies categories of smells.

The multimodal candidate extraction manager 1037 may collect objects belonging to at least one object category derived by the back-end system 700. Here, the collected objects correspond to candidates that are to be provided as answers to the user.

The answer candidate extractor 1038 extracts candidates of an answer probabilistically considering a possibility depending on a taste of the user from results collected as one set.

The answer elector 1039 may select one answer or a preset number of answers having a highest priority from candidates of extracted answers.

The back-end system 700 includes a sensing data knowledge reasoner 1041, a sensing data knowledge based repository 1042, a sensing DB 1043, a knowledge reasoner 1044, a knowledge based repository 1045, and a DB 1046.

The sensing data knowledge reasoner 1041 estimates objects, which may be answers, based on received sensing data and question. In detail, the sensing data knowledge reasoner 1041 may check correlations between answers to a question and the sensing data based on the received sensing data and question to search the sensing data knowledge repository 1042 and the sensing DB 1042 for objects that will belong to a category of sensed data.

The sensing data knowledge based repository 1042 may store objects for which a human conceptualizes sensing data. For example, the sensing data knowledge based repository 1042 may store particular conceptualized languages such as "smell", "food smell", or "bad smell" corresponding to an instance of a sensed smell.

The sensing DB 1043 may store an object. In detail, the sensing DB 1043 may store objects that indicate top and bottom relations or correlation attributes, and relations between concepts.

The knowledge reasoner 1044 may estimate context information. In detail, the knowledge reasoner 1044 may search the knowledge repository 1045 and the DB 1046 to estimate information for determining an object to be recognized among objects based on situation information.

For example, the knowledge reasoner 1044 may determine that there is a high probability of an object satisfying a question used by many users and an answer result to the quest being an object to be recognized and determine that there is a high probability of an object having a high preference being an object to be recognized in consideration of a use history of a particular user.

The knowledge repository 1045 may store context information for determining that an object has a positive or negative attribute, such as tone information of a voice indicating an expression of a face and a feeling of the user.

The DB 1046 may store information such as questions of all users, answer results to the questions, an accuracy of an object estimation, or a user history of a user.

As described above, a system for recognizing an object may more accurately and quickly calculate a result estimated as an object and provide the result to a user, by using a communication performed between a user terminal device and a server through a network.

Figure 11:
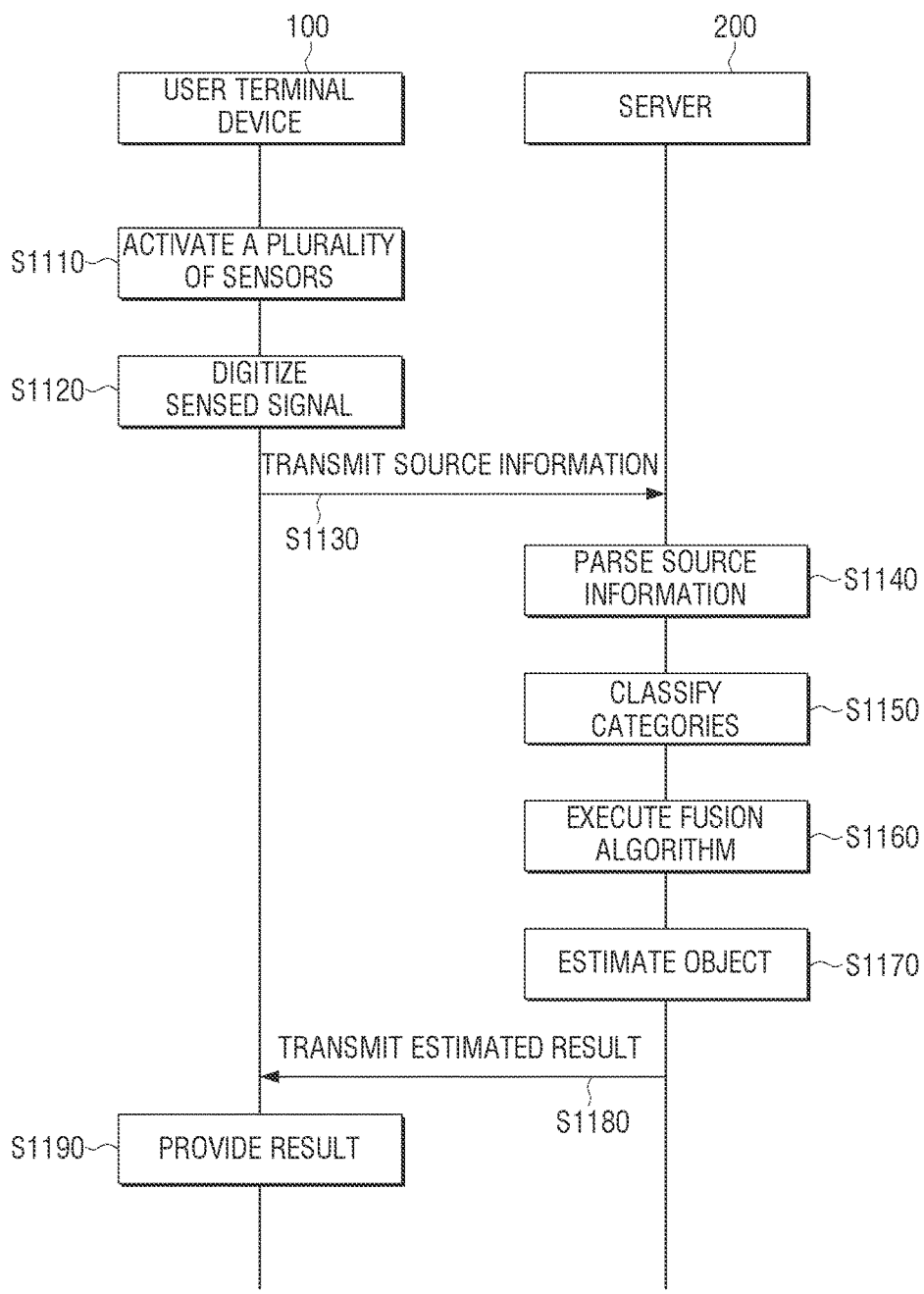
FIG. 11 is a sequence diagram illustrating an operation of the object recognizing system of FIG. 10 according to an embodiment of the present disclosure.

FIG. 11 is a sequence diagram illustrating an operation of the system 1000 of FIG. 10 according to an embodiment of the present disclosure.

Referring to FIG. 11, in operation S1110, the user terminal device 100 activates a plurality of sensors automatically or through a manual operation of a user. In detail, the user may execute a program for recognizing an object of the user terminal device 100 and, if a sensing signal having a preset size is input into a sensor, activate the plurality of sensors.

In operation S1120, the user terminal device 100 digitizes an analog sensing signal input into an external environment so as to enable the analog sensing signal to be used by an electronic device.

In operation S1130, the user terminal device 100 transmits source information, which is acquired through a sensor, to the server 200. In detail, the user terminal device 100 may transmit the sensing information as a sensing result to the server 200 without processing the source information and transmits the source information through a process of reducing transmission traffic. In addition, the user terminal device 100 may transmit question information that is to be acquired from the sensing result.

In operation S1140, the server 200 parses the received source information based on the received question information. In detail, the server 200 may parse the sensed source information to extract meaningful data.

In operation S1150, the server 200 classifies categories according to the parsed source information. In detail, the server 200 may classify and form categories according to sensing results acquired from a plurality of different types of sensors.

In operation S1160, the server 200 checks objects belonging to the formed categories and executes a fusion algorithm. In detail, the server 200 may execute an algorithm for searching for objects commonly belonging to the object categories.

In operation S1170, the server 200 estimates an object from a plurality of objects. In detail, in operation S1170, the server 200 may select one object or a plurality of objects estimated as an object to be recognized from commonly belonging objects calculated as candidates of results according to priorities, a taste of the user, or a statistical probability.

In operation S1180, as an answer to the question, the server 200 transmits one object or a plurality of objects, which is estimated as an object, as an estimated result to the user terminal device 100.

In operation S1190, the user terminal device 100 provides received estimated results to the user.

A system for recognizing an object as described above may more accurately and quickly calculate a result estimated as an object and provide the result to a user, by using a communication performed between a user terminal device and a server through a network.

Figure 12:
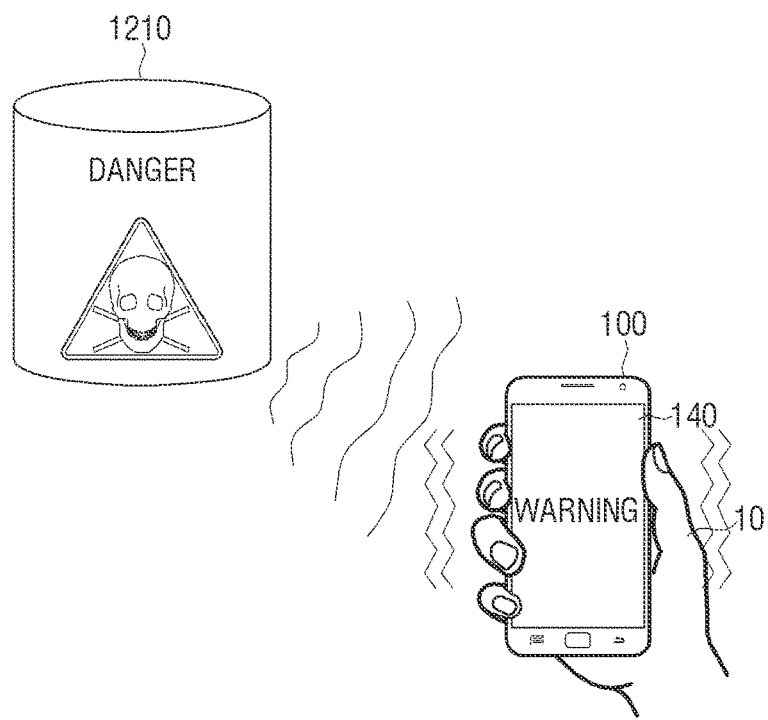
FIG. 12 is a view illustrating sensing and an operation of a user terminal device according to an embodiment of the present disclosure.

FIG. 12 is a view illustrating sensing and an operation of a user terminal device according to an embodiment of the present disclosure.

Referring to FIG. 12, a user 10 carries a user terminal device 100 and is positioned around a dangerous material 1210.

The dangerous material 1210 emits a smell. The emitted smell is sensed by a smell sensor of the user terminal device 100 the user 10 carries.

In this case, the user terminal device 100 may determine that the sensed smell is a smell of the dangerous material 1210 and informs the user 10 of a danger. For example, the user terminal device 100 may vibrate, make a warning sound, or visually display a screen 140 including a warning message to inform the user 10 of the danger.

The operation of the user terminal device 100 according to the present embodiment may be performed to inform a visually handicapped person that a dangerous material exists around. Also, the user terminal device 100 may sense an emitted poisonous gas or an increase in a concentration of carbon monoxide in fire to inform the user 10 of an invisible danger.

Figure 13:
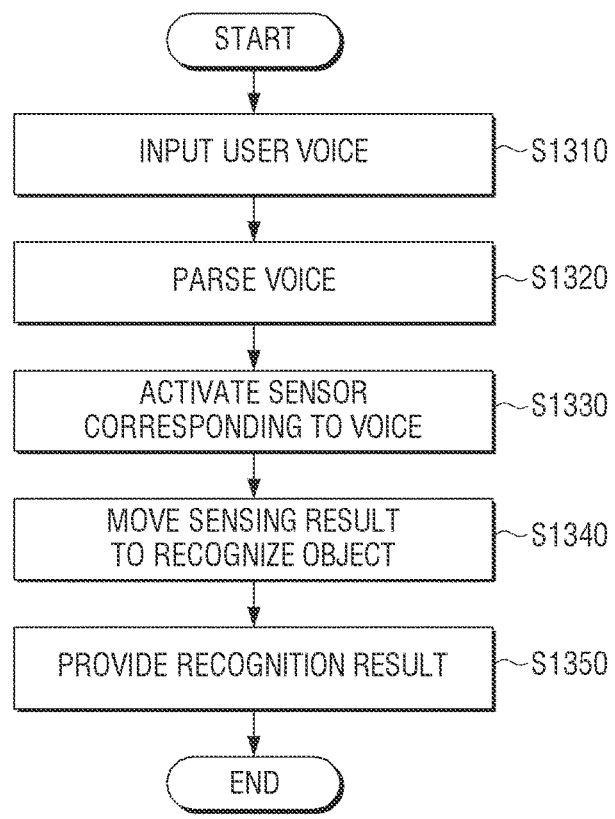
FIG. 13 is a flowchart illustrating a method of recognizing an object of a user terminal device according to an embodiment of the present disclosure.

FIG. 13 is a flowchart illustrating an object recognizing method of a user terminal device according to an embodiment of the present disclosure.

Referring to FIG. 13, in operation S1310, a voice of a user is input into a user terminal device. Here, the user terminal device may use a microphone as a unit for receiving the voice of the user.

In operation S1320, the user terminal device parses the voice of the user to check that an arbitrary object is an intended to be known and starts a process of recognizing an object.

In operation S1330, the user terminal device activates at least one of a plurality of sensors of the user terminal device as the process of recognizing the object. In detail, the fact that an object to be recognized is about a smell is parsed from the voice of the user, a smell sensor, a front camera for reading an expression of the user, and a position sensor may be activated.

In operation S1340, the user terminal device recognizes an object by using a sensing result sensed by the activated sensor. In detail, one object including all of characteristics of a plurality of sensing results is reasonably estimated, and then the estimated result is determined as an object.

In operation S1350, the user terminal device provides the user with the result recognized as the object. A providing method, for example, may give out the same smell as a sensed smell, display a message or a picture, or provide a voice through a speaker.

According to the object recognizing method of the user terminal device as described above, if a particular object is to be recognized, a plurality of sensors that are preset may be automatically activated to acquire a plurality of pieces of information associated with the object. Therefore, a result estimated as the object may be more accurately and quickly calculated to be provided to a user.

An object recognizing method according to an embodiment of the present disclosure may be realized in the user terminal device 100 of FIGS. 2 and 7. Also, the object recognizing method may be realized by a program code that is stored on various types of recording media and executed by a CPU or the like. The program code by which the object recognizing method is realized may be distributed in an application form through a public network such as the Internet in a user terminal device that is realized as a smartphone.

In detail, a code for performing the above-described methods may be stored on various types of non-transitory recording media that may be read by a terminal, such as an RAM, a flash memory, an ROM, an EPROM, an EEPROM, a register, a hard disc, a removable disc, a memory card, a USB memory, a CD-ROM, etc.

Figure 14:
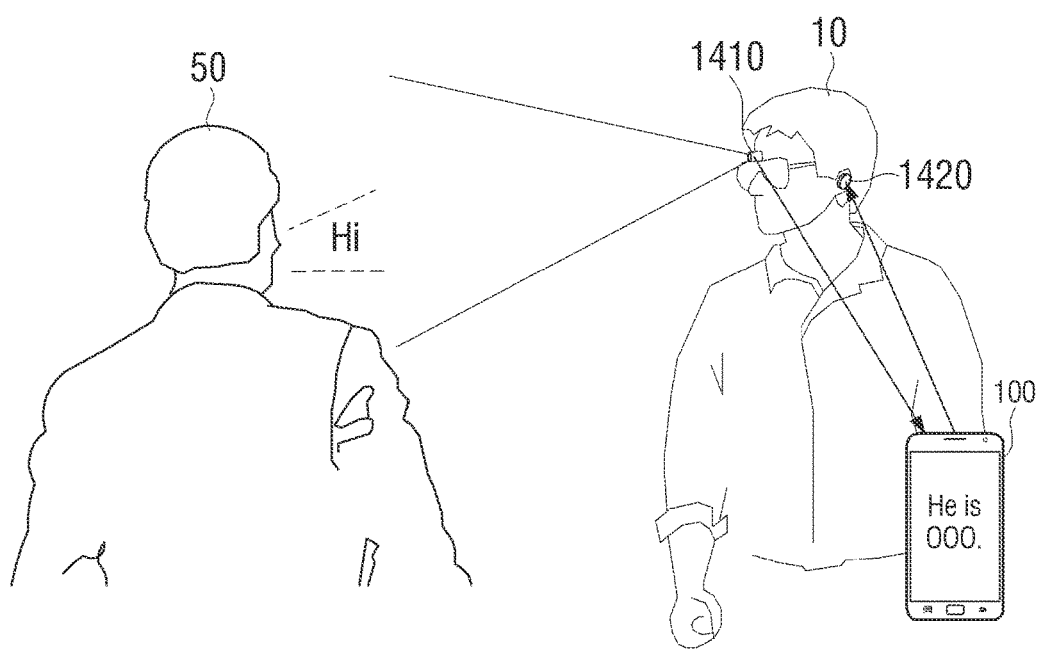
FIG. 14 is a view illustrating a method of a method of recognizing an object of a user terminal device according to an embodiment of the present disclosure.

FIG. 14 is a view illustrating an object recognizing method of a user terminal device according to an embodiment of the present disclosure.

Referring to FIG. 14, when a user 10 meets in with another person 50, the user 10 recognizes the other person 50 of a user terminal device to be informed of an identity of the another person 50.

The user 10 wears glasses having a camera 1410 and an earphone 1420 and carries a user terminal device 100.

The camera 1410 captures an object existing in a direction toward which the user 10 faces. In detail, the camera 1410 may capture the other person 50 that the user 10 looks at.

The earphone 1420 may receive information about the object recognized by the user terminal device 100 and output the information as a voice to ears of the user 10. In detail, the earphone 1420 may receive data about a voice signal into which a result estimated as the identity of the other person 50 by the user terminal device 100 is converted and output the data into the ears of the user 10 through a speaker.

The user terminal device 100 receives a command for executing an object recognizing process. In detail, the user terminal device 100 may receive an execution command through a manipulation of the user 10, receive a voice input "Who is it?" and parse the received voice to determine that the command for executing the object recognizing process is received.

Alternatively, the user terminal device 100 may determine an object that is interested by eyes of the user 10 and receive an image of an object of interest captured by the camera 1410 to automatically execute a process of recognizing the object of interest.

The user terminal device 100 communicates with external devices. In detail, the user terminal device 100 may communicate with the camera 1410 of the glasses worn by the user 10 and the earphone 1420. The user terminal device 100 may also automatically try paring with a user terminal device (not shown) of the other person 50 to communicate with the user terminal device of the other person 50.

The user terminal device 100 may receive the image captured by the camera 1410 to estimate who the another person 50 is. Also, the user terminal device 100 may receive information for checking the identity of the other person 50 and estimate who the another person 50 is, based on the receive information through a communication with an electronic device carried by the other person 50.

All elements constituting various embodiments of the present disclosure may be combined into one or may be combined to operate but are not limited thereto. In other words, all elements may be selectively combined into one or more to operate within the scope of the present disclosure. Also, each of all elements may be realized as one independent piece of hardware but some or all of the elements may be selectively combined to be realized as a computer program having a program module performing some or all of functions that are combined in one piece of hardware or a plurality of pieces of hardware.

Codes and code segments constituting the computer program may be easily inferred by those skilled in the art. The computer program may be stored on a non-transitory computer-readable media to be read and executed by a computer so as to embody various embodiments of the present disclosure.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a digital versatile disc (DVD), a hard disk, a blue-ray disk, a USB, a memory card, a ROM, or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An object recognizing method of a user terminal device, the object recognizing method comprising:
   activating a first sensor and a second sensor included in a plurality of different types of sensors;
   obtaining first information by sensing a target object using the first sensor and second information by sensing the target object using the second sensor;
   determining a first category to which the target object belongs based on the first information and a second category to which the target object belongs based on the second information, the first category being parallel with the second category;
   determining first objects included in the first category and second objects included in the second category; and
   estimating an object commonly belonging to the first objects and the second objects as a recognition result of the target object,
   wherein the determining of the first and second categories further comprises:
      in response to a user image being captured by a camera as one of the plurality of sensors, parsing a user expression in the user image;
      determining that the first and second categories are from a positive category comprising objects having positive attributes if the user expression is determined to be a positive expression; and
      determining that the first and second categories are from a negative category comprising objects having negative attributes if the user expression is determined to be a negative expression.

2. The object recognizing method of claim 1, further comprising:
   giving a plurality of object categories probabilistic numbers to which an object to be recognized belongs,
   wherein the estimating comprises estimating an object, which has a high probability as the object to be recognized among a plurality of objects commonly belonging to the plurality of object categories, as the recognition result based on the probabilistic numbers given to the plurality of object categories.

3. The object recognizing method of claim 1, further comprising:
   determining a plurality of object categories; and
   in response to position information of the user terminal device being sensed by a position sensor as one of the plurality of sensors, determining an object category comprising objects existing in a location corresponding to the position information.

4. The object recognizing method of claim 3, wherein the determining of the plurality of object categories comprises:
   in response to a smell being sensed by a smell sensor as one of the plurality of sensors, determining an object category comprising objects associated with the smell.

5. The object recognizing method of claim 4, wherein the determining of the plurality of object categories comprises:
   in response to a sound being sensed by a sound sensor as one of the plurality of sensors, determining an object category comprising objects associated with the sound.

6. The object recognizing method of claim 3, wherein the determining of the plurality of object categories further comprises:
   in response to a user voice being sensed by a sound sensor as one of the plurality of sensors, parsing a tone of the user voice; and
   determining one selected from the positive category and the negative category according to a characteristic of the tone.

7. The object recognizing method of claim 3, wherein the determining of the plurality of object categories further comprises:
   in response to a bio-signal being sensed by a bio-signal sensor as one of the plurality of sensors, determining one selected from the positive category and the negative category according to a characteristic of the bio-signal.

8. The object recognizing method of claim 1 wherein the plurality of sensors comprise at least one selected from a sound sensor, a smell sensor, a camera, a position sensor, a motion sensor, a pressure sensor, a fingerprint sensor, a hall sensor, an inertia sensor, an acceleration sensor, a heart rate sensor, an illumination sensor, a Wi-Fi sensor, and a compass sensor.

9. A user terminal device comprising:
   a plurality of different types of sensors comprising a first sensor and a second sensor; and
   a processor configured to:
      activate a first sensor and a second sensor included in the plurality of different types of sensors,
      obtain first information by sensing a target object using the first sensor and second information by sensing the target object using the second sensor,
      determine a first category to which the target object belongs based on first information and a second category to which the target object belongs based on the second information, the first category being parallel with the second category,
      determine first objects included in the first category and second objects included in the second category, and
      estimate an object commonly belonging to the first objects and the second objects as a recognition result of the target object,
   wherein the plurality of sensors comprises a camera, and
   wherein the processor is configured to determine the first and second categories by:
      in response to a user image being captured by the camera, parsing a user expression in the user image;
      determining that the first and second categories are from a positive category comprising objects having positive attributes if the user expression is determined to be a positive expression; and
      determining that the first and second categories are from a negative category comprising objects having negative attributes if the user expression is determined to be a negative expression.

10. The user terminal device of claim 9, wherein the processor is further configured to:
    give a plurality of object categories probabilistic numbers to which an object to be recognized belongs, and
    estimate an object, which has a high probability as the object to be recognized among a plurality of objects commonly belonging to the plurality of object categories, as the recognition result based on the probabilistic numbers given to the plurality of object categories.

11. The user terminal device of claim 9,
    wherein the plurality of sensors comprise a position sensor,
    wherein the processor is further configured to, in response to position information of the user terminal device being sensed by the position sensor, determine an object category comprising objects existing in a location corresponding to the position information.

12. The user terminal device of claim 11,
wherein the plurality of sensors further comprise a smell sensor,
wherein the processor is further configured to, in response to a smell being sensed by the smell sensor, determine an object category comprising objects associated with the smell.

13. The user terminal device of claim 12,
wherein the plurality of sensors further comprise a sound sensor,
wherein the processor is further configured to, in response to a sound being sensed by the sound sensor, determine an object category comprising objects associated with the sound.

14. The user terminal device of claim 9,
wherein the plurality of sensors further comprise a sound sensor,
wherein the processor is further configured to, in response to a user voice being sensed by the sound sensor, parse a tone of the user voice and determine one selected from the positive category and the negative category according to a characteristic of the tone.

15. The user terminal device of claim 9,
wherein the plurality of sensors further comprise a bio-signal sensor,
wherein the processor is further configured to, in response to a bio-signal of a user being sensed by the bio-signal sensor, determine one selected from the positive category and the negative category according to a characteristic of the bio-signal.

16. The user terminal device of claim 9, wherein the plurality of sensors comprise at least one selected from a sound sensor, a smell sensor, a camera, a position sensor, a motion sensor, a pressure sensor, a fingerprint sensor, a hall sensor, an inertia sensor, an acceleration sensor, a heart rate sensor, an illumination sensor, a Wi-Fi sensor, and a compass sensor.

* * * * *